Oct. 9, 1956 K. J. GREELEY 2,766,063
TWO WHEELED SELF-DUMPING WHEELBARROW
Filed May 19, 1953 2 Sheets-Sheet 1
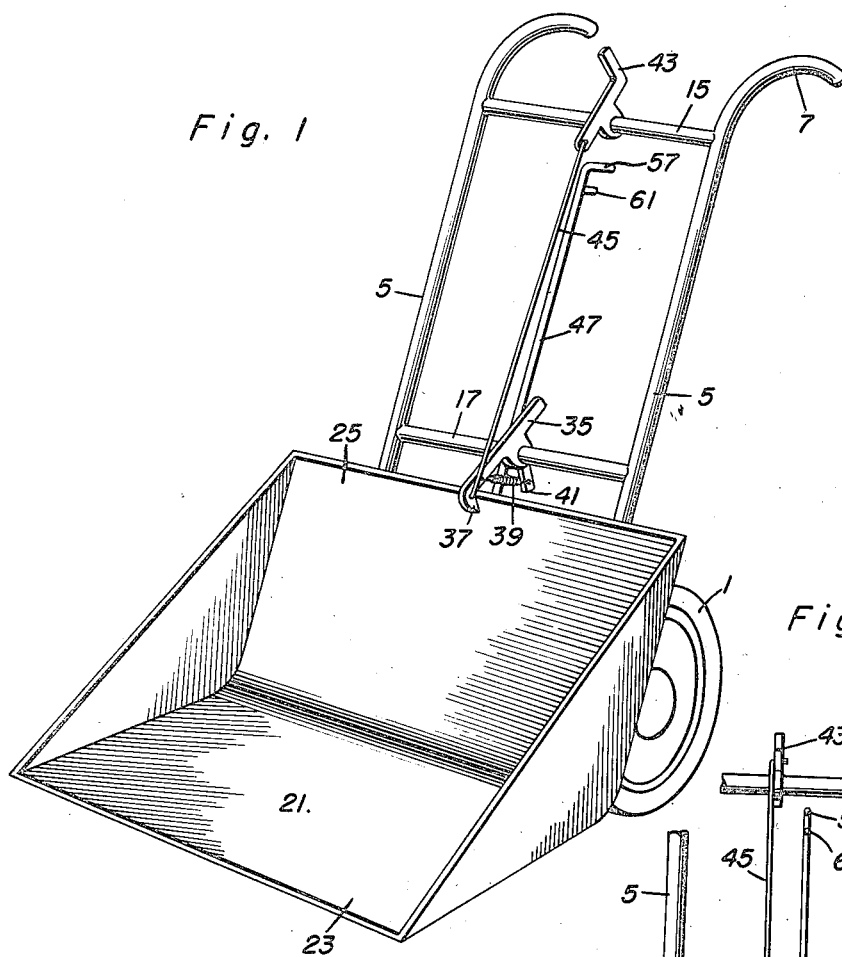
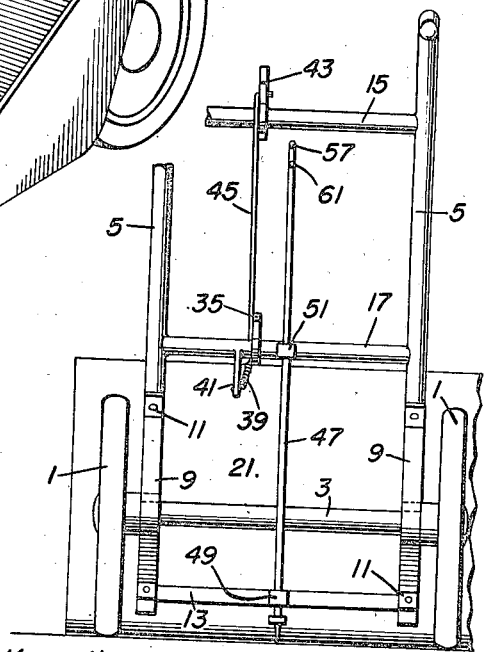
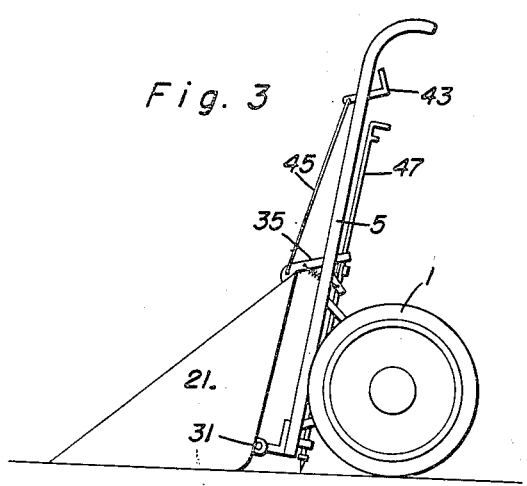
Kenneth J. Greeley INVENTOR.
BY *Clarence A. O'Brien*
*and Harvey B. Jacobson*
Attorneys

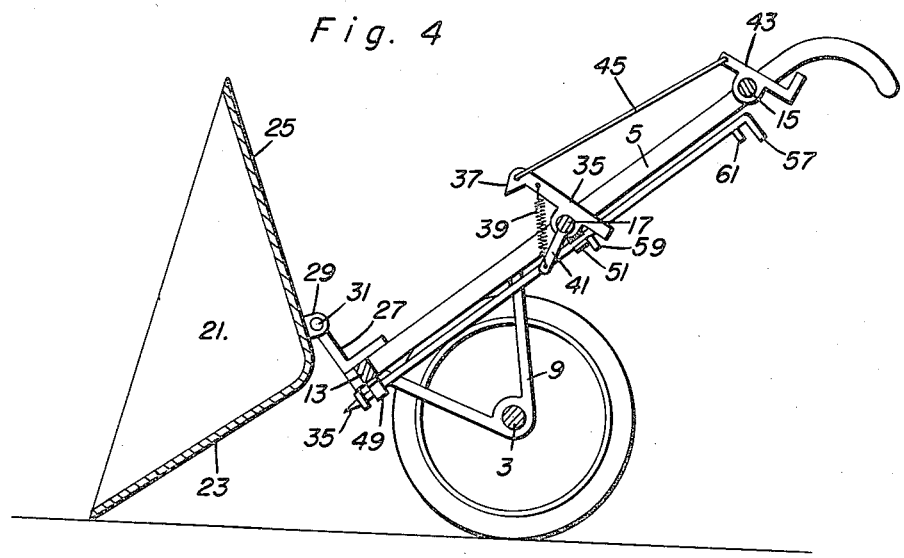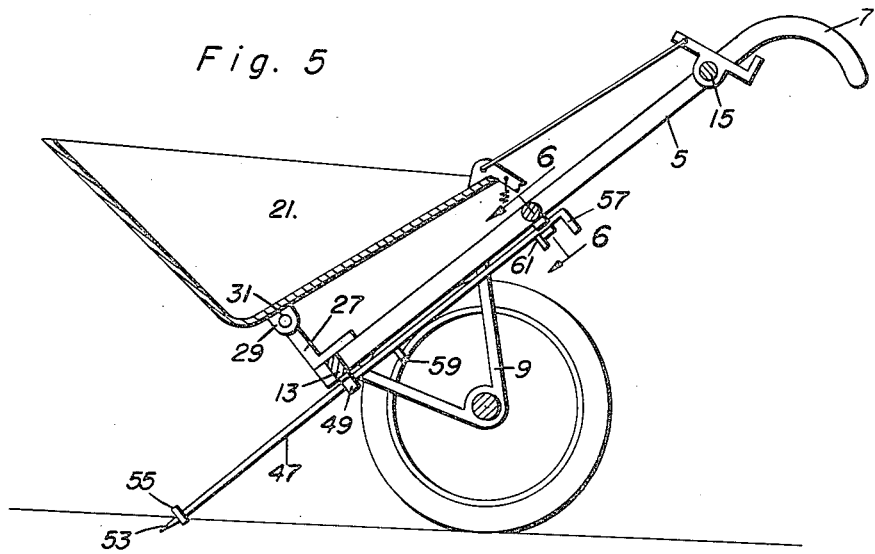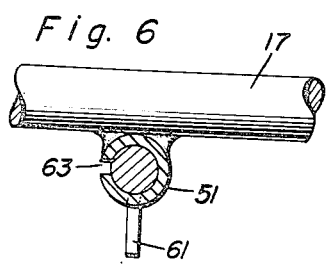

United States Patent Office 2,766,063
Patented Oct. 9, 1956

2,766,063

TWO WHEELED SELF-DUMPING WHEELBARROW

Kenneth J. Greeley, Cedar Glenn, Calif.

Application May 19, 1953, Serial No. 356,079

4 Claims. (Cl. 298—5)

My invention relates to improvements in wheelbarrows of the two wheeled self-dumping body type.

The primary object of my invention is to provide a wheelbarrow of the type indicated which is better balanced when loaded than the usual wheelbarrow and therefore easier to propel with a heavy load.

Another object is to provide in such a wheelbarrow, a self-dumping body having its center of gravity spaced well forwardly of the axis of the wheels for easier balancing of the load while the wheelbarrow is being propelled, together with mounting means for the body whereby it is overbalanced for pivotal swinging quickly from load carrying position into forwardly dumping position.

Still another object is to provide in such a wheelbarrow, ground engaging means for holding the body in load carrying position against swinging downwardly so that the body may be loaded in load carrying position.

Still another object is to provide a wheelbarrow of the type and for the purposes above indicated which is comparatively simple in construction and inexpensive to manufacture, and safe to use.

Other and subordinate objects, together with the precise nature of my improvements will become readily apparent when the succeeding description and claims are read with reference to the drawings accompanying and forming part of this specification.

In said drawings:

Figure 1 is a view in perspective of my improved wheelbarrow with the handle bars swung into substantially upright position to lower the body into ground engaging position for picking up a load from the ground;

Figure 2 is a fragmentary view in rear elevation of the same;

Figure 3 is a view in side elevation of the same drawn to a smaller scale;

Figure 4 is a view partly in longitudinal section and partly in side elevation illustrating the body swung downwardly into dumping position;

Figure 5 is a similar view illustrating the body in load carrying position and ground engaging means holding the same against downward swinging out of load carrying position, and Figure 6 is a fragmentary enlarged view in vertical transverse section taken on the line 6—6 of Figure 5.

Referring to the drawings by numerals, the wheelbarrow of my invention comprises a pair of side ground wheels 1 on an axle 3, a pair of the usual rearwardly extending side handle bars 5 with rear hand grips 7, and a pair of V-shaped bearing brackets 9 on the axle 3 depending from and bolted, as at 11, to the front end portions of the side bars 5 and supporting said bars above the axle 3 for tilting upwardly and forwardly, or downwardly and rearwardly. The handle bars 5 are crossconnected by a front transverse bar 13 at the front ends thereof, a rear transverse rod 15 adjacent the hand grips 7, and an intermediate transverse rod 17 in the rear of the brackets 9.

The body 21 is of scoop form and of V-shape longitudinally of the wheelbarrow to provide obtuse angled front and rear flat, bottom walls 23, 25 and is pivotally mounted on the handle bars 5 by the following means.

A pair of L-shaped brackets 27 are suitably secured on the front ends of the handle bars 5 in upstanding position thereon. A pair of bearing ears 29 depend from the rear bottom wall 25 of the body 21 rearwardly of the transverse center of said body and are pivoted between said brackets 27 by transverse pivots 31.

As will be seen, the body 21 is carried by the described mounting means on the front ends of the handle bars 5 well forwardly of the axis of tilting movement of said handle bars 5 so that a load may be easily balanced by tilting of said handle bars 5 to move the center of gravity of the load with respect to said axis, and said body 21 is pivoted to said brackets 27 with its center of gravity offset forwardly of its pivot for quick self-dumping of said body by pivoting of the same forwardly and downwardly from substantially horizontal load carrying position.

Releasable latch means is provided for holding the body 21 against pivoting out of load carrying into dumping position. This means comprises a latch dog 35 upstanding from and pivoted on the intermediate rod 17 for forward swinging to engage a beak 37 thereon over the upper edge of the rear wall 25. A coil spring 39 suitably connected to said dog 35 and to a lug 41 on said rod 17 urges the latch dog 35 into latching position. A hand lever 43 is pivoted on the rear rod 15 and operatively connected, by a pivoted rod 45, to said dog 35 so that said lever is manually operative to swing said dog 35 rearwardly into unlatching position and to permit said dog to swing into latching position under the urge of the coil spring 39.

Ground engaging means is provided for preventing the handle bars 5 from tilting upwardly and forwardly in the load carrying position of the body 23 to thereby maintain said body in said position for loading in that position when desired. For this purpose a ground engaging rod 47 is slidably mounted between and parallel with the handle bars 5 in front and rear sleeves 49, 51 on the front transverse bar 13 and the intermediate transverse rod 17 for projection forwardly of said handle bars 5 and the axle 3 to engage a pointed round penetrating front end 53 thereof with the ground. A shoulder 55 on said end 53 limits penetration of said end. As will be seen, the rod 47 forms a support for the handle bars 5 to support the body 21 and is slidable rearwardly to retract the same into ineffective position, and also rotatable in the sleeves 49, 51, for a purpose presently seen. A handle 57 on the rear end of the rod 47 provides for manually sliding and rotating the same.

The rod 47 and the sleeve 51 are provided with coengaging devices for locking said rod in projected ground engaging position and retracted ineffective position, respectively, and which will now be described. A pair of lateral pins 59, 61 are provided on the rear end and an intermediate portion of said rod 47 for engagement with the front and rear sides of the sleeve 51, respectively, to hold said rod in projected and retracted positions, respectively. The pins 59, 61 are adapted to be aligned with a slot 63 in the sleeve 51 by rotation of said rod and passed through said slot by projection and retraction of said rod respectively to be rotated by rotation of the rod so as to position the pin 59 in front of said sleeve 51, or the pin 61 in the rear of said sleeve, according to whether said rod 47 is in projected or retracted position. The use and operation of the described wheelbarrow will be readily understood. By tilting the handle bars 5 forwardly and upwardly, into substantially upright position, with the body 21 latched and the ground engaging rod 47 retracted, the body 21 may be lowered to the ground with its front bottom wall 23 substantially flat against the same, all as shown in Figures 1, 2 and 3, so that the wheelbarrow may be propelled forwardly to cause said body to pick up a load off the ground, or the like. The handle bars 5 may then be swung downwardly and rearwardly, as shown in Figure 3, to lift the body 21 into load carrying position for propelling of the load. By unlatching the body 21 in its load carrying position, it will swing downwardly and forwardly, by gravity, into forwardly dumping position.

For loading the body 21, as with a liquid, or the like, the ground engaging rod 47 may be projected to support the handle bars 5 against upward and forward tilting in the load carrying position of the body 21 and thereby support and hold said body in load carrying position, all as shown in Figure 5.

The body 21 may be swung upwardly and rearwardly, after dumping, into load carrying position by tilting the handle bars 5 upwardly and forwardly in the dumping position of said body until the latch dog 35 is in position for latching, after which the hand lever 43 may be manipulated to permit the latch dog 35 to swing into latching position, whereupon the handle bars 5 may be tilted downwardly and rearwardly to lift the body 21 into load carrying and propelling position.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

What is claimed as new is as follows:

1. In a two wheeled wheelbarrow, a wheel supported axle, a pair of cross connected side handle bars mounted on said axle in rearwardly extending position for tilting upwardly and forwardly and downwardly and rearwardly, a load carrying body, means pivotally mounting said body on said bars forwardly of the axis of tilting movement of said bars for swinging downwardly bodily from a load carrying position into ground engaging position by tilting of said bars upwardly and forwardly, said body being swingable pivotally forwardly and downwardly into dumping position, releasable latch means mounted on said bars for preventing pivotal swinging of said body, and ground engaging means mounted on said bars for engaging the ground obliquely thereof forwardly of said axle to prevent upward and forward tilting of said bars and downward swinging of said body bodily, said ground engaging means being slidable into ground engaging and ineffective positions respectively.

2. In a two wheeled wheelbarrow according to claim 1, said body being overbalanced forwardly on its pivotally mounting means for quick swinging into dumping position when unlatched.

3. In a two wheeled wheelbarrow according to claim 1, said ground engaging means including a rod slidable between said bars parallel therewith into oblique ground engaging position and having a ground penetrating end.

4. In a wheelbarrow according to claim 3, said rod being rotatable and means for locking said rod by rotation thereof in ground engaging and ineffective positions respectively.

References Cited in the file of this patent

UNITED STATES PATENTS 2,103,866   Norris _____ Dec. 28, 1937

FOREIGN PATENTS 67,531   Denmark _____ Aug. 30, 1948